G. SIMON.
Trimming.

No. 218,786.  Patented Aug. 19, 1879.

Witnesses.
Otto Hufeland
William Miller

Inventor
Gustave Simon.
by Van Santvoord & Hauff
his attorneys.

UNITED STATES PATENT OFFICE.

GUSTAVE SIMON, OF NEW YORK, N. Y.

IMPROVEMENT IN TRIMMINGS.

Specification forming part of Letters Patent No. 218,786, dated August 19, 1879; application filed June 12, 1879.

*To all whom it may concern:*

Be it known that I, GUSTAVE SIMON, of the city, county, and State of New York, have invented a new and useful Improvement in Trimmings, which invention is fully set forth in the following specification, reference being had to the accompanying drawings, in which—

Figure 1:
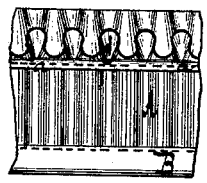
Figure 2:
Figure 3:

Figure 1 is a side view of the trimming. Fig. 2 is a top view thereof. Fig. 3 is an end view of the same.

Similar letters indicate corresponding parts.

My invention relates especially to ruches to be used for the neck, and as trimming for light and thin fabrics; its object being to secure for such ruches fullness of edge and comparative lightness and flexibility of body, in order that the neck may not be uncomfortably burdened or confined, and that garments of thin, light, and flexible material may be ornamented with the universally-admired ruche-edgings, and still not overweighted or rendered stiff and ungraceful in appearance and set by their trimmings.

My improved trimming consists of a main part or body formed of an angular piece of material, a band or binding-strip attached to the lower edge of such body, and one or more continuous wings or branches formed of an angular piece of material, which is attached to the body near its upper edge, so that while the article has the desired fullness at the upper edge, its lower part is left of one or a single thickness.

The material used to form the wing or wings I usually press along the line of its junction with the body, in order to shape and give permanency to the wing or wings.

In the drawings, the letter A designates a body; B, a band or binding-strip, and C a wing upon the body, constituting a trimming of the nature of my invention. Both the body A and the wing C are formed of angular material, and in the example shown they are both fluted; but, if desired, either or both may be crimped, plaited, or gathered in any known way.

The band B is attached to the lower edge of the body A in any usual or suitable manner, the same being made of muslin, silk, or other suitable material.

The piece of material composing the wing C is attached to the body A by a line of stitches, *a*, parallel to and near the upper edge of the body, or in any other suitable manner so that the wing is continuous with the body. If the material composing the wing C is of such a nature as to make it desirable to press the same along the line of its junction with the body A, this may be accomplished by a hot iron or other suitable means. If seen fit, one or more wings may be added to the wing C, and in that case the several wings may be arranged, like the wing C, with a tendency to project upward; or they may be arranged to project both upward and downward.

It will be seen that by my invention a full or spread upper edge is given to a ruche or trimming with the least amount of material, thereby rendering the same light and comfortable to wear, as well as cheap.

I do not claim, broadly, a two-ply or double-edge ruche, as it has been long in use, and is not my invention.

What I claim as new, and desire to secure by Letters Patent, is—

As a new article of manufacture, a ruche or trimming consisting of a body, A, of a single thickness, having attached to its lower edge a continuous band or binding-strip, B, and provided with a narrow wing or continuous fluted strip, C, stitched near its upper edge to, and projecting laterally from, said body, substantially as described.

In testimony whereof I have hereunto set my hand and seal.

GUSTAVE SIMON. [L. S.]

Witnesses:
 MAX ROSENTHAL,
 M. H. SEGALLA.